United States Patent [19]
Nonaka et al.

[11] Patent Number: 5,328,273
[45] Date of Patent: Jul. 12, 1994

[54] SPHERICALLY SLIDING BEARING UNIT HAVING A MULTI-LAYER LINER AND ITS MANUFACTURING METHOD

[75] Inventors: Toshihiko Nonaka, Kamakura; Kohei Yuasa, Gifu, both of Japan

[73] Assignee: Nippon Thompson Co., Ltd., Tokyo, Japan

[21] Appl. No.: 910,940

[22] Filed: Jul. 9, 1992

[30] Foreign Application Priority Data

Jul. 12, 1991 [JP] Japan .................................. 3-197300

[51] Int. Cl.$^5$ ............................................. F16C 23/04
[52] U.S. Cl. ...................................... 384/206; 384/208
[58] Field of Search ................ 384/206, 208, 145, 146, 384/207, 213

[56] References Cited

U.S. PATENT DOCUMENTS 3,339,989 9/1967 Kraus .................................... 384/206
4,582,368 4/1986 Fuhita et al. ......................... 384/300
4,846,590 7/1989 Teramachi ........................... 384/208

Primary Examiner—Lenard A. Footland
Attorney, Agent, or Firm—Skjerven, Morrill, MacPherson, Franklin & Friel

[57] ABSTRACT

A spherically sliding bearing unit generally includes an inner member having a first spherical surface, an outer member having a second spherical surface located opposite to and spaced apart from the first spherical surface, and a liner fixedly attached to the second spherical surface of the outer member to thereby provide a sliding interface between the liner and the first spherical surface of the inner member. The liner has a two-layer structure including an inner layer comprised of a resin material having a low coefficient of friction and an outer layer comprised of a metal. Preferably, the metal outer layer has an irregular structure, such as radial projections or grooves, such that a physically strong coupling can be provided between the liner and the outer member.

4 Claims, 5 Drawing Sheets

Fig. 3
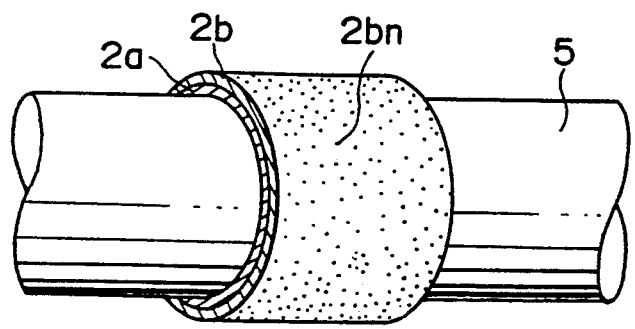
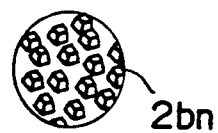
Fig. 3a
Fig. 4
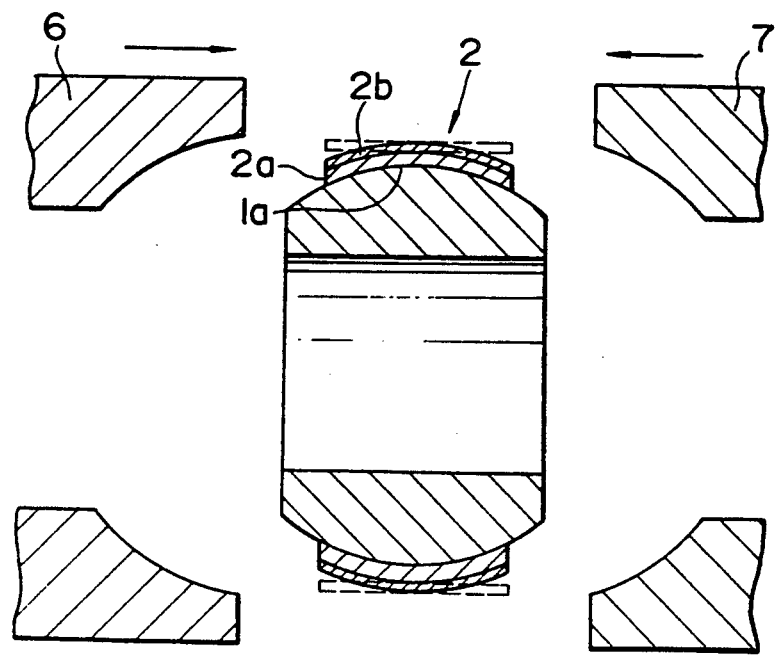

SPHERICALLY SLIDING BEARING UNIT HAVING A MULTI-LAYER LINER AND ITS MANUFACTURING METHOD

BACKGROUND OF THE INVENTION

1. Field of the Invention

This invention generally relates to a bearing unit having a spherical sliding surface and its manufacturing method, and, in particular, to a greaseless spherically sliding bearing unit suitable for use in various link mechanisms in transmission and steering systems of automobiles or the like.

2. Description of the Prior Art

A spherically sliding bearing unit is well known in the art and its typical example is illustrated in the Japanese Patent Post-examination Pub. No. 51-42569 and shown here in FIGS. 8 through 9.

As shown in FIG. 8, a spherical surface sliding bearing unit typically includes an inner member 50 having a spherical outer peripheral surface, an outer member 51 having a spherical inner peripheral surface opposite to and spaced apart from the spherical outer peripheral surface of the inner member 50 and a liner or self-lubricating thin plate 52 interposed between the inner and outer members 50 and 51. The liner 52 is typically comprised of a low friction high polymer material such as fluorine family resin and fixedly attached to the outer member 51 so as to provide a greaseless sliding contact at an interface between the inner member 50 and the liner 52.

In manufacturing the bearing unit shown in FIG. 8, as shown in FIG. 9, an inner member 50 having a liner 52 of a low friction high polymer material placed on its outer peripheral surface is located inside a mold cavity 53, which corresponds in shape to the outer contour of the outer member 51, as a molding core. Then, a low melting point alloy in a molten state is poured into the cavity to define the outer member 51 by forging. The alloy thus poured is then allowed to cool to solidify so that the liner 52 becomes fixedly attached to the outer member 51 thus formed. Described more in detail in this respect, when the alloy poured into the cavity is cooled to solidify, the alloy in the cavity becomes somewhat shrunk so that the liner 52 placed on the inner member 50 comes to be compressed, thereby preventing the inner member 50 from moving freely relative to the outer member 51. Thus, after forging, as shown in FIG. 10, an external force is applied to have the outer member 51 compressed in the axial direction so as to have the outer member 51 slightly deformed to thereby provide a predetermined small gap between the inner member 50 and the liner 52. Because of the provision of such a gap, the inner member 50 may move pivotally relative to the outer member 51 and thus the liner 51 fixedly attached to the outer member 51.

However, the prior art spherical surface sliding bearing unit as described above has the following disadvantages.

In the first place, at the time of forging, the liner 52 is partly melted to be fixedly attached to the inner surface of the outer ring 51. However, since the outer member 51 is formed from a metal and the liner 52 is comprised of a resin, the coupling between these elements is inherently weak so that the liner 52 tends to be separated away from the outer ring 51 during use, particularly when a shear is applied between them. As a result, the liner 52 gradually becomes shifted in position so that the outer ring 51 may come into direct contact with the inner ring 50, which could provide an increased sliding resistance and a biased wear to the sliding surface of at least one of the inner and outer members 50 and 51 which, in turn, could produce an undesired play in a sliding motion.

Second, since the liner 52 is comprised only of a resin material, it is inherently low in the resistance against compression, so that when a relatively large compression force is applied thereto by the inner ring 50, a damage may result in the liner 52. Thus, there is a limit in the ability to bear a load by the liner 52. In addition, since a fluorine family resin material used in forming the liner 52 is relatively low in thermal conductivity, the liner 52 cannot be instrumental in dissipating the heat produced due to friction between the inner member 50 and the liner 52, and, thus, the sliding surfaces can become overheated and in the worst case stuck due to burning.

Third, while forming the outer member 51 by forging, it is important that a measure be taken to prevent any molten metal from escaping and coming into contact with the inner member 50. This is because if any of the molten metal sneak into an interface between the inner ring 50 and the liner 52, when the molten metal becomes hardened, an undesired metal comes to be present between the inner member 50 and the liner 52 and can cause an undesired wear to the sliding surface of the inner member 50. In addition, the liner 52 may be damaged to impair the performance of the bearing unit.

Fourth, as shown in FIG. 10, in the prior art process, after forging the outer member 51, an external force is applied to the outer member 51 in the axial direction after forging so as to provide a small gap at the interface between the inner member 50 and the liner 52. According this prior scheme, the outer member 51 becomes bent in the shape of a bow in cross section so that the gap thus formed is the largest at the center of the outer ring 51 and the smallest at each edge 51a of the inner member 50. As a result; the sliding resistance presented by the sliding surface of the inner member 50 becomes non-uniform, and it can impair a smooth movement of the inner member 50. Besides, since the gap is not uniform, the liner 52 may come to contact with the inner ring 50 only at its edges 51a when loaded and the contact between the inner member 50 and the liner 52 becomes local so that a biased wear could take place at these edges 51a. In order to cope with this situation, the gap must be designed to be relatively large, which is disadvantageous because of incapability to withstand a large impact load and a relatively large play resulting therefrom.

SUMMARY OF THE INVENTION

In accordance with the present invention, there is provided a spherically sliding bearing unit generally comprising: an inner member having a first spherical surface; an outer member having a second spherical surface located opposite to and spaced apart from said first spherical surface; and a liner fixedly attached to said second spherical surface of said outer member, said liner including an outer layer comprised of a first material and fixedly attached to said second spherical surface and an inner layer comprised of a second material different from the first material and slidably contactable with the first spherical surface of said inner member.

Preferably, the outer layer of the liner is provided with an irregular surface so that the liner can be partly anchored in the outer member 3. In the preferred embodiment, the first material is a metal and the second material is a resin such as a fluorine family resin. Preferably, the second material is a fabric material of resin filaments.

In accordance with another aspect of the present invention, there is provided a method for manufacturing a spherically sliding bearing unit, comprising the steps of: providing a first layer of a first material; fixedly attaching a second layer of a second material on said first layer to form a multi-layer liner; placing said liner on a first spherical surface of an inner member with said first layer in contact with said inner member; locating said inner member with said liner in a cavity; pouring a molten metal into said cavity to form an outer member integrally with said second layer of said liner; and, after removing a combination of said inner member, outer member and liner from said cavity upon solidification of said molten metal, applying an external force to said outer member so as to provide a gap between said inner member and said first layer such that said inner member may move relative to said outer member and said liner while keeping a sliding contact with said first layer.

Preferably, the second layer is provided with an irregular surface at its outer surface so that the second layer can be physically integrated with the outer member when said outer member is formed by forging. The first material preferably includes a low friction resin material, such as a fluorine family resin, and, most preferably, a fabric material comprised of resin filaments. The second material is preferably a metal.

It is therefore a primary object of the present invention to provide an improved spherically sliding bearing unit and its manufacturing method.

Another object of the present invention is to provide an improved spherically sliding bearing unit high in integrity, smooth in operation, long in service life.

A further object of the present invention is to provide an improved method for manufacturing a spherically sliding bearing unit easy and simple to implement.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic illustration showing a step of pressing an inner layer of filament based fabrics against an outer layer of metal ring so as to define a multi-layered liner during a process for manufacturing a spherically sliding bearing unit in accordance with a preferred method of the present invention;

FIG. 3a is a detailed view of the surface of the outer layer shown in FIG. 3;

FIG. 4 is a schematic illustration showing a step of pressing the multi-layered liner formed by the step of FIG. 3 onto a spherically shaped outer peripheral surface of an inner member when pressing molds are located at their retracted positions during the preferred method of the present invention;

DESCRIPTION OF THE PREFERRED EMBODIMENTS

Figure 1:
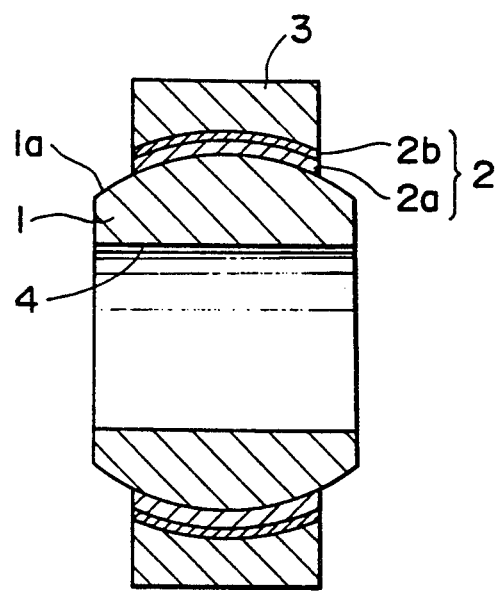
FIG. 1 is a schematic illustration showing in transverse cross section a spherically sliding bearing unit constructed in accordance with one embodiment of the present invention.
Figure 2:
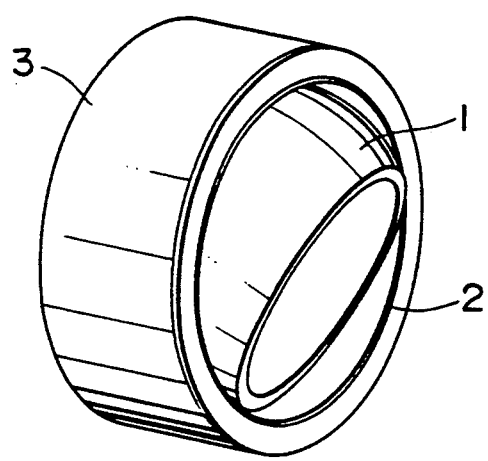
FIG. 2 is a schematic illustration showing in perspective view the bearing unit of FIG. 1.

Referring now to FIGS. 1 and 2, there is schematically shown a spherically sliding bearing unit constructed in accordance with one embodiment of the present invention. As shown, the present spherically sliding bearing unit includes an inner member 1 generally in the form of a ring and having a spherically shaped outer peripheral surface. The inner member 1 is also formed with a through-hole 4 having a desired cross sectional shape so that any desired element can be coupled to the inner member 1 as inserted into the through-hole 4. The bearing unit also includes a multi-layered liner 2 and an outer member 3 which is also generally in the shape of a ring in the illustrated embodiment. The outer member 3 is formed with a spherically shaped inner peripheral surface located opposite to and spaced apart from the spherically shaped outer peripheral surface of the inner ring 1 when assembled as shown in FIG. 1. The multi-layered liner 2 is fixedly attached to the spherically shaped inner peripheral surface of the outer member 3 so that the inner most surface of the multi-layered liner 3 is also spherically shaped and in sliding contact with the spherically shaped outer peripheral surface of the inner ring 1.

As a result, a sliding interface is defined at an interface between the inner member 1 and the multi-layered liner 2 since the multi-layered liner 2 is fixedly attached to the outer member 3. With this structure, if the outer member 3 is provided stationarily, the inner member 1 may move pivotally as well as rotationally relative to the outer member 3. For example, the outer member 3 may be provided at one end of a link (not shown) and a rotating shaft (not shown) may be fitted into and fixedly attached to the inner member 1. In this case, the rotating shaft can not only rotate relative to the outer member 3, but also can pivot relative to the outer member 3.

In accordance with an important feature of the present invention, the multi-layered liner 2 includes an inner layer 2a and an outer layer 2b in the illustrated embodiment. It is to be noted that the multi-layered liner 2 may have three or more layers, if desired. Preferably, the inner layer 2a is comprised of a first material and the outer layer 2b is comprised of a second material different from the first material. The first material is so selected that it can provide a good sliding contact with the inner member 1 and the second material is so selected that it can provide a strong mechanical integrity between the liner 2 and the outer member 3.

Described more in detail, the inner layer 2a has an outer sliding surface which is spherically shaped and in sliding contact with the spherically shaped inner sliding surface of the inner ring 1. Thus, in order to provide the best possible performance as a sliding bearing unit, the inner layer 2a must be so structured that it is at least low in frictional coefficient and high in wear and heat resistance characteristics. Preferably, the inner layer 2a also has a capability to withstand a relatively large load and it is preferable to be high in thermal conductivity and low in coefficient of thermal expansion. In order to satisfy the conditions set forth above, the inner layer 2a is preferably comprised of a sheet of resin material. The resin material is preferably a fluorine family resin material, such as polyethylene tetrafluoride (PTEF). In the illustrated embodiment, use is made of TEFLON (tradename of Mitsui-Dupont Floro Chemical K.K. of Japan). In a preferred embodiment, the inner layer 2a is made of a sheet of woven fabrics using polyester or glass fibers and the TEFLON fibers. Thus, the inner layer 2a is preferably made of a sheet of filament based woven fabrics.

On the other hand, the outer layer 2b includes a material which provides a strong mechanical integrity between the inner layer 2a and the outer member 3 and/or a high thermal conductivity so as to allow the heat created due to the sliding motion between the inner ring 1 and the inner layer 2a to be dissipated effectively. For this purpose, the outer layer 2b is preferably comprised of a metal such as a copper alloy high in thermal conductivity. The inner layer 2a is fixedly attached to the outer layer 2b adhesively or by means of any other appropriate method. In a preferred embodiment, the outer layer 2b is provided with an irregular surface at least at a part of its outer peripheral surface. The irregular surface may be defined as any deviation in radial direction from a spherical surface in the present invention. For example, a plurality of radially extending projections may be provided at the outer peripheral surface of the outer layer 2b, or, alternatively, grooves may be formed in the outer peripheral surface of the outer layer 2b, for example, by knurling or pressing. The provision of such an irregular structure to the outer peripheral surface of the outer layer 2b is particularly advantageous since it can provide a strong anchoring effect to the outer member 3 to thereby provide a strong mechanical integrity between the liner 2 and the outer member 3. In particular, since the liner 2 receives a rotationary force from the inner member 1 when the inner member 1 executes a pivotal motion, such an irregular structure is particularly advantageous in preventing the liner 2 from rotating relative to the outer member 3. It is to be noted that such an irregular structure may also be provided at an interface between the inner and outer layers 2a and 2b, if desired.

Referring now to FIGS. 3 through 7, a method for manufacturing a spherically sliding bearing unit in accordance with one embodiment of the present invention will be described.

In the first place, the inner member 1 is preferably fabricated from a metal workpiece, for example, by machining. That is, a metal work piece is machined to provide the inner member 1 having the spherical outer peripheral surface 1a and the through-hole 4. Preferably, after machining, the inner member 1 is heat-treated or quenched and subjected to finish grinding. Then, the spherical outer peripheral surface 1a is finished by lapping.

Then, a sheet of metal is formed into a cylinder having a predetermined diameter and then cut into a ring having a desired width, which defines the outer layer 2b of the liner 2. In one embodiment, the outer surface of such a metal ring is subjected to knurling to thereby provide an up and down or irregular structure. In another embodiment, such an irregular structure may be provided to the outer peripheral surface of the metal ring or outer layer 2b when the liner 2 is pressed onto the inner member 1 as will be described in detail later. Then, a strip of woven filaments preferably woven from polyester or glass fiber filaments and TEFLON filaments is pressed against the inner peripheral surface of the metal ring 2b thus formed with an adhesive therebetween with the application of heat. Thus, the strip of woven filaments is combined with the metal ring outer layer 2b to define the inner layer 2a. In this manner, there is obtained a two-layer liner 2.

Then, as shown in FIG. 3, an aluminum rod 5 having a diameter which is slightly smaller than the inner diameter of the two-layered liner 2 thus obtained is inserted into the ring-shaped liner 2. With the rod 5 inserted into the ring-shaped liner 2, a heat is applied at least to the rod 5 so that the rod 5 expands due to thermal expansion. As a result, the woven resin filament strip inner layer 2a becomes compressed against the metal ring outer layer 2b, which allows the inner layer 2a to be strongly adhered to the outer layer 2b. Thereafter, the rod 5 is allowed to cool so that the rod 5 shrinks to its original diameter so that it can be easily removed from the ring-shaped liner 2. It is to be noted that the ring-shaped liner 2 thus formed should have an inner diameter which is at least equal to or slightly larger than the largest outer diameter at the outer peripheral surface 1a of the inner member 1.

Figure 5:
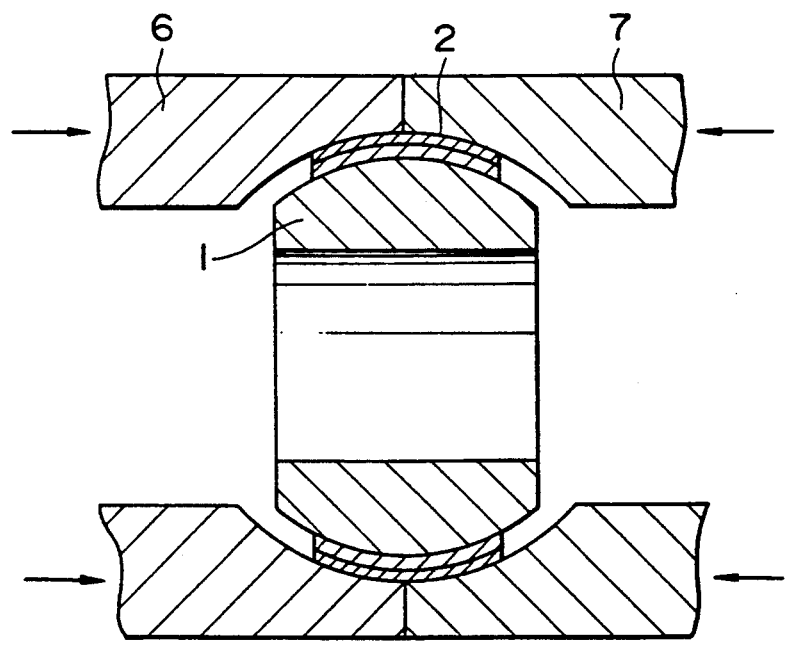
FIG. 5 is a schematic illustration showing also the step of pressing the multi-layered liner formed by the step of FIG. 3 onto the inner member when the pressing molds are located at their advanced positions.
Figure 6:
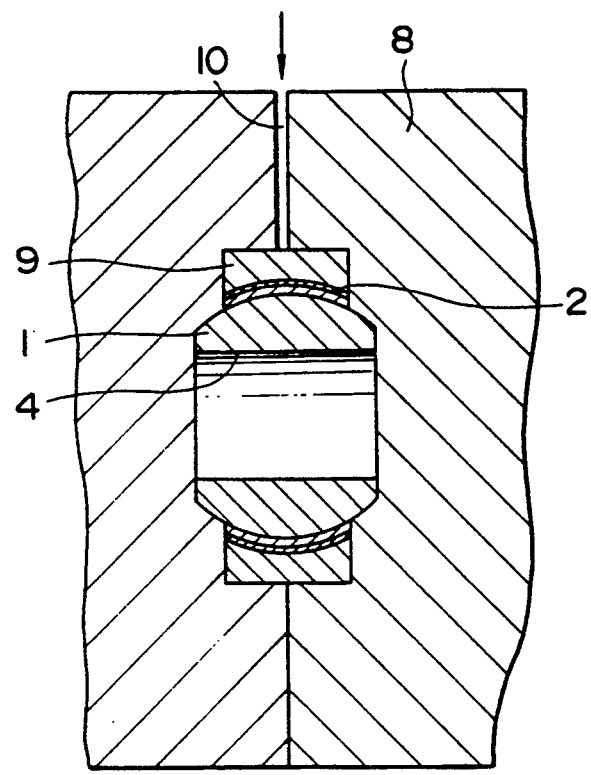
FIG. 6 is a schematic illustration showing a step of forming an outer member by forging with a combination of the inner member and the multi-layered liner located in a cavity in accordance with the preferred method of the present invention.

Then, as shown in FIG. 4, the ring-shaped liner 4 thus formed is fitted onto the inner member 1 as indicated by the dotted line and the inner member 1 with the liner 4 is located in a predetermined position between a pair of left and right pressing mold halves 6 and 7, each of which has a curved pressing surface. As described previously, in one embodiment, each of such curved pressing surface may be provided with an irregular surface, such as projections, so as to define an irregular structure to the outer peripheral surface of the outer layer 2a of the liner 2 when pressed. Then, as indicated by the arrows in FIG. 4, the left and right mold halves 6 and 7 are moved closer to each other until they come to a predetermined advanced position as shown in FIG. 5 from the retracted position shown in FIG. 4. Therefore, the ring-shaped liner 2 comes to be pressed against the spherical outer peripheral surface 1a of the inner ring 1 so that the liner 2 becomes spherically shaped in compliance with the spherical shape of the outer peripheral surface 1a of the inner ring 1. As a result, the inner peripheral surface of the liner 2 comes to be in contact with the outer peripheral surface 1a of the inner ring 1 substantially in its entirety.

Then, the inner ring 1, together with the liner 2, is removed from the pressing mold halves 6 and 7 by moving the mold halves 6 and 7 back to their retracted position and then located in a predetermined position within a cavity 9 of a die cast mold 8, which also includes a pair of separable mold halves. The cavity 9 substantially corresponds in shape to the outer member 3 and a passage 10 extends to the cavity 9 from an outer surface of the mold 8. Thus, a molten metal may be poured into the cavity 9 via the passage 10 to define the outer member 3. Preferably, use may be made of zinc (melting point approximately 420 degrees Centigrade), aluminum (melting point approximately 660 degrees Centigrade) or the like.

When a molten metal is poured into the cavity 9 and solidified to define the outer member 3, there can be obtained a strong mechanical coupling between the outer layer 2b and the outer member 3 since the molten metal can flow into any irregular structure provided at the outer peripheral surface of the outer layer 2b to thereby provide an anchoring effect. In this instance, since the inner layer 2a is adhesively and closely in contact with the outer layer 2b and the inner layer 2a is in close contact with the outer peripheral surface 1a of the inner ring 1, there is no chance that the molten metal sneaks around the edges of the outer layer 2b toward the inner ring 1.

Figure 7:
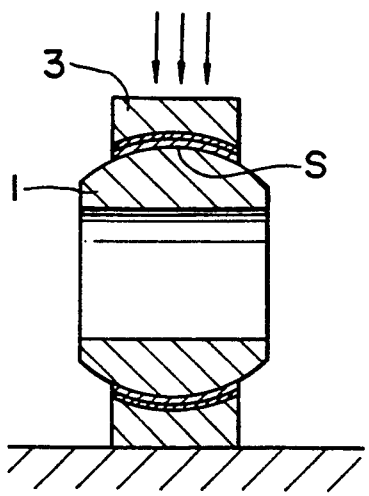
FIG. 7 is a schematic illustration showing a step of applying an external force to the outer member to thereby provide a gap at a sliding interface in the bearing unit after the forging step in accordance with the preferred method of the present invention.
Figure 8:
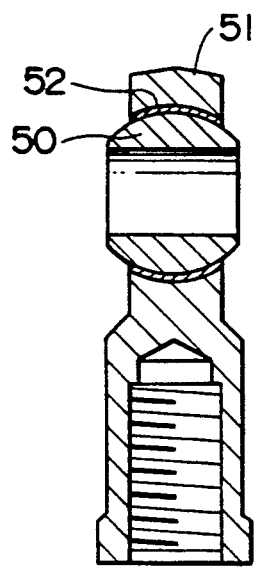
FIG. 8 is a schematic illustration showing in transverse cross section a prior art spherically sliding bearing unit.
Figure 9:
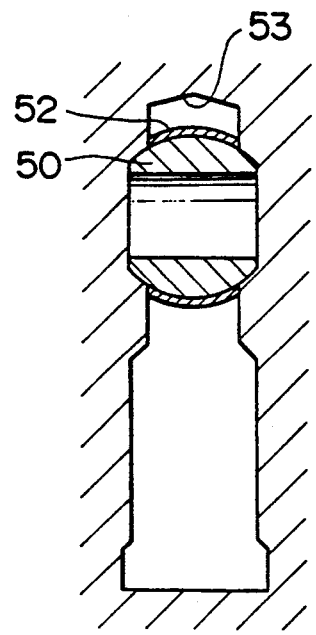
FIG. 9 is a schematic illustration showing a step of forming an outer member of the bearing unit shown in FIG. 8 in accordance with the prior art manufacturing method.
Figure 10:
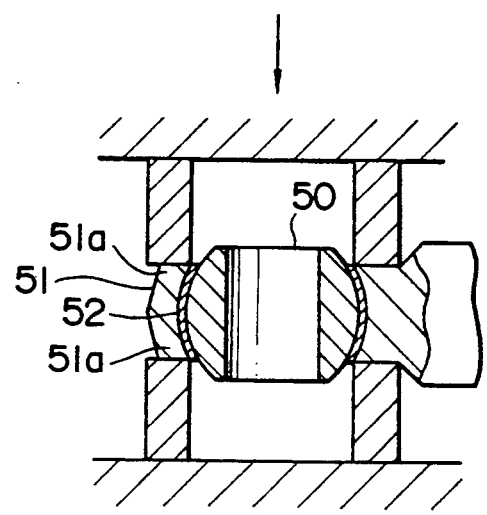
FIG. 10 is a schematic illustration showing a step of applying an external force to the outer member after forging shown in FIG. 9 to thereby provide a gap at a sliding interface.

Then, after sufficient solidification of the molten metal, the mold 8 is opened to remove the resulting product from the mold 8. Thereafter, as shown in FIG. 7, an external force is applied to the outer member 3 radially inwardly as indicated by the arrows in FIG. 7 so that the liner 2 sandwiched between the inner and outer metal members 1 and 3 and fixedly attached to the outer member 3 is caused to stretch sidewise along the spherical outer peripheral surface 1a of the inner member 1, which, in turn, provides a small gap S between the liner 2 and the inner member 1 uniformly. Then, the outer member 3 is subjected to a finish step to remove undesired flash or the like to complete the manufacturing process.

In accordance with the preferred embodiment of the present invention, since an irregular structure or up and down structure 2bn is provided in the outer peripheral surface of the metal ring outer layer 2b as best shown in FIG. 3, a physically strong coupling or anchoring structure can be formed at an interface between the outer layer 2b and the outer member 3. In the structure shown in FIG. 3, the irregular structure 2bn is illustrated as a plurality of radially extending projections; however, the irregular structure 2bn can be formed in any desired manner, such as grooves running in the outer peripheral surface of the outer layer 2b. In the latter case, the grooves preferably should include a portion extending in a direction other than the circumferential direction at least partly.

In the present invention, the metal ring outer layer 2b also serves to prevent any molten metal from sneaking around its edges to come into contact with thee inner layer 2a when the molten metal is poured into the cavity 9 in which the inner member 1, together with the liner 2, is located. Thus, there is no chance that the inner layer 2a of woven sheet of resin filaments is damaged by a hot molten metal or shifted in position during manufacture. Moreover, since the liner 2 is strongly fixedly attached to the outer member 3, it is unlikely that the liner 2 comes to be shifted in position or separated away from the outer member 3 even if a shear force is applied at an interface between the liner 2 and the outer member 3.

Since the metal ring outer layer 2b has an excellent thermal conductivity, any heat produced at a sliding interface between the inner ring 1 and the liner 2 can be rapidly dissipated into the outer member 3. Therefore, the sliding interface can be effectively cooled and maintained at a predetermined temperature even if the bearing unit is subjected to a continuous operation for an extended period of time. Furthermore, in accordance with the present invention, since an external force is applied to the outer member 3 radially inwardly to have the inner layer 2a stretched sidewise when a predetermined gap S is to be provided at a sliding interface between the inner member 1 and the liner 2, the resulting gap S is uniform in magnitude all across the sliding surface. Thus, the gap S can be set at a minimal value and a smooth operation can be guaranteed. Moreover, it is unlikely that a biased wear could occur to the liner 2. Since a close tolerance can be adopted in the present invention, the bearing unit can be manufactured at an extremely high accuracy.

It is to be noted that although the bearing unit described above includes a ring-shaped outer member 3, the outer member 3 does not have to be in the form of a ring and it may also be a part of any structural member, such as an end of a rod. Thus, the overall structure of the outer member 3 should not be limited to a ring alone.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

We claim:
1. A spherically sliding bearing unit comprising:
an inner member having a first spherical surface;
an outer member having a second spherical surface located opposite to and spaced apart from said first spherical surface; and
a liner fixedly attached to said second spherical surface of said outer member, said liner including an outer layer comprised of a metal and fixedly attached to said second spherical surface and an inner layer comprised of a sheet of woven filaments, at least some of which are comprised of a resin and slidably contractable with said first spherical surface of said inner member.

2. The unit of claim 1, wherein a predetermined gap is provided between said first spherical surface of said inner member and said inner layer of said liner.

3. The unit of claim 1, wherein said outer layer includes an irregular structure at an interface with said outer member, said irregular structure being a deviation from a spherical shape so as to provide a physical coupling between said outer layer of said liner and said outer member.

4. The unit of claim 1, wherein said filaments include at least one of polyester, glass fiber and fluorine resin filaments.

* * * * *